United States Patent [19]

Dickson et al.

[11] Patent Number: 4,512,535
[45] Date of Patent: Apr. 23, 1985

[54] TAPE CASSETTE WITH CLUTCH ASSEMBLY

[75] Inventors: Edward J. Dickson, 55 Charles St. W., Apt. 3103, Toronto, Ontario, Canada; Richard J. Armstrong, Toronto, Canada

[73] Assignee: Edward John Dickson, West Toronto, Canada

[21] Appl. No.: 591,915

[22] Filed: Mar. 21, 1984

Related U.S. Application Data

[63] and a continuation-in-part of Ser. No. 544,505, Oct. 24, 1983, abandoned, which is a continuation-in-part of Ser. No. 476,916, Mar. 21, 1983, abandoned.

[30] Foreign Application Priority Data

Mar. 2, 1983 [CA] Canada .................................. 422682

[51] Int. Cl.³ ..................... G11B 15/32; G11B 23/04; B65H 17/02
[52] U.S. Cl. .................................. 242/200; 242/67.4; 242/201
[58] Field of Search ............... 242/200, 201, 202, 203, 242/204, 199, 193, 194, 67.4; 192/44, 45

[56] References Cited

U.S. PATENT DOCUMENTS

| 2,028,512 | 1/1936 | Maier | 192/44 X |
| 3,476,226 | 11/1969 | Massey | 192/44 X |
| 3,487,900 | 1/1970 | Dahl | 192/106.1 X |
| 3,537,554 | 11/1970 | Elmore | 192/45 |
| 4,059,245 | 11/1977 | Hirose | 242/201 |
| 4,341,294 | 7/1982 | Kerr | 192/45 |
| 4,346,414 | 8/1982 | Osanai | 242/201 X |

FOREIGN PATENT DOCUMENTS 2089765 6/1982 United Kingdom ............... 242/199

Primary Examiner—Stuart S. Levy
Assistant Examiner—Leo J. Peters
Attorney, Agent, or Firm—Fetherstonhaugh & Co.

[57] ABSTRACT

A tape cassette having a body and two reels rotatable with respect to the body, one of the reels having a roller clutch between it and the body, the roller clutch having rollers, a ring extending around the rollers, and a roller cage, the rollers being contained in channels with a ramp surface formed in the roller cage, the rollers having a wedging surface adapted to wedge between the ramp surface and a ring to prevent rotation of the reel in one direction but permit rotation in the other direction, the rollers being adjustable to remove them from operative relation with the ring whereby to free the reel for rotation in either direction.

12 Claims, 8 Drawing Figures

TAPE CASSETTE WITH CLUTCH ASSEMBLY

This invention relates to a cassette that has a releasable clutch assembly for permitting one of its reels to be rotated in one direction only until released and is a continuation-in-part of application Ser. No. 544,505 filed Oct. 24, 1983, now abandoned, which is a continuation-in-part of application Ser. No. 06/476916 filed Mar. 21, 1983, now abandoned.

It will be described in relation to a video tape cassette for which there is a requirement to permit the tape to be wound from the supply reel to the take-up reel but then to prevent rewinding to the supply reel except under the control of the person responsible for the further use of the tape. The requirement arises in the business of renting tape cassettes. Owners of proprietary material contained on these tapes rent them and they would like to be assured that the lessee will play the tape past a reproducing head of a video tape machine only once. The producer of a movie, for example, who places his movie on a video tape cassette has it available to him to rent such a cassette to the many owners of video tape playing machines. If, however, on one single rental, and for one rental fee, the tape is played many times the owner of the movie is deprived of the value of his proprietary interest in the copyright to the movie if he receives a rental for only one play of the tape.

It is an object of this invention to provide a tape or wire cassette with a reliable, inexpensive clutch mechanism that will permit the tape or wire to be wound from one reel to the other but not rewound to the first reel until the clutch mechanism has been released by application of a means that can be retained within the knowledge of the tape owner.

With this and other objects in view, a tape or wire cassette having a casing and reels mounted for rotation within the casing and connectable to a rotatable drive shaft to transfer tape from one reel to the other is characterized by: locking means for locking one of said reels against rotation with respect to the casing in only one direction when operative; said locking means being releasable to render it inoperative and to permit said reel free rotation with respect to the casing in either direction; said locking means including a roller cage, brake means and rollers; one of said roller cage and brake means being nonrotatable with respect to said body the other of the roller cage and brake means being nonrotatable with respect to the reel; said roller cage having a series of channels arranged in a circle; each channel of said series of channels having one of said rollers therein; said brake means having a brake surface; said roller cage and said brake surface of said brake means defining a space therebetween that is annular in cross section, each of said channels of said series of channels having a ramp surface at its bottom that slopes towards the brake surface on the brake means in the direction against which the locking means locks; said rollers being moveable longitudinally of their respective channels between positions to actuate said locking means between an operative position and an inoperative position, said operative position being one where they can cooperate with the roller cage and brake means to wedge between a brake surface of the brake means and the ramp surface of the roller cage to lock against rotation of reel with respect to the casing in one direction and permit free rotation in the other direction, the inoperative position being one where the rollers have no cooperative relation with the roller cage and brake means whereby to permit free rotation of the reel with respect to the casing in either direction of rotation. The invention will be clearly understood after reference to the following detailed specification read in conjunction with the drawings.

IN THE DRAWINGS

The drawings generally refer to a cassette for a video tape. It has a supply reel 12 and a take-up reel 14 mounted for rotation within a body generally indicated by numeral 10. In use the cassette is mounted in a video machine and the tape is drawn past a video playing or recording head as it is taken from the supply reel to the take-up reel. The tape can be rewound on the supply reel by reversing the tape drive. The general construction of the cassette and its use in a video tape machine is well known and not referred to in any further detail in this specification.

This invention is concerned with a clutch between the take-up reel, in the case of the embodiment described herein, and the body of the cassette. The purpose of the clutch, while operative, is to permit tape feed in one direction only so that the tape can be wound onto the take-up reel from the supply reel but cannot be rewound from the take-up reel back to the supply reel unless the clutch is rendered inoperative. Alternatively, the clutch can be designed to lock the supply reel against rotation that permits transfer to the take-up when operative. Provision is included in the clutch for rendering it inoperative.

Figure 3:
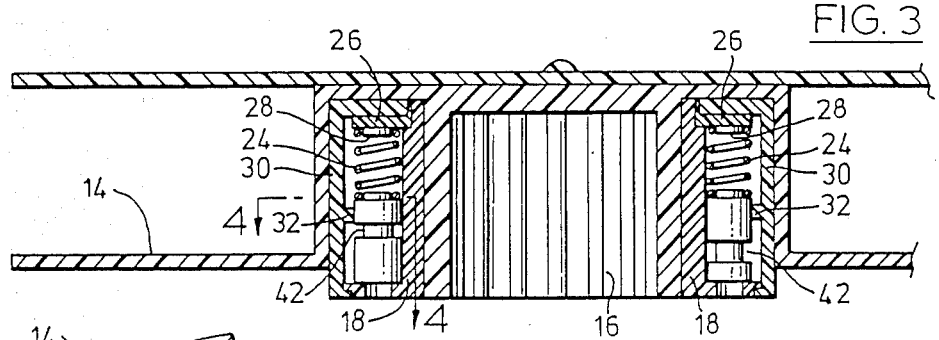
FIG. 3 is a sectional view through the clutch assembly of the take-up reel illustrating the rollers in wedging relation between the roller cage and brake.

FIG. 3 is an illustration of a cross-section of the take up reel which illustrates the operation and design of the embodiment illustrated. In this drawing, the take-up reel is generally indicated by the numeral 14. It has a conventional winding surface upon which the tape can be wound and a central opening 16, the wall of which is keyed for connection to a drive spindle of a conventional tape deck.

Figures 1, 2:
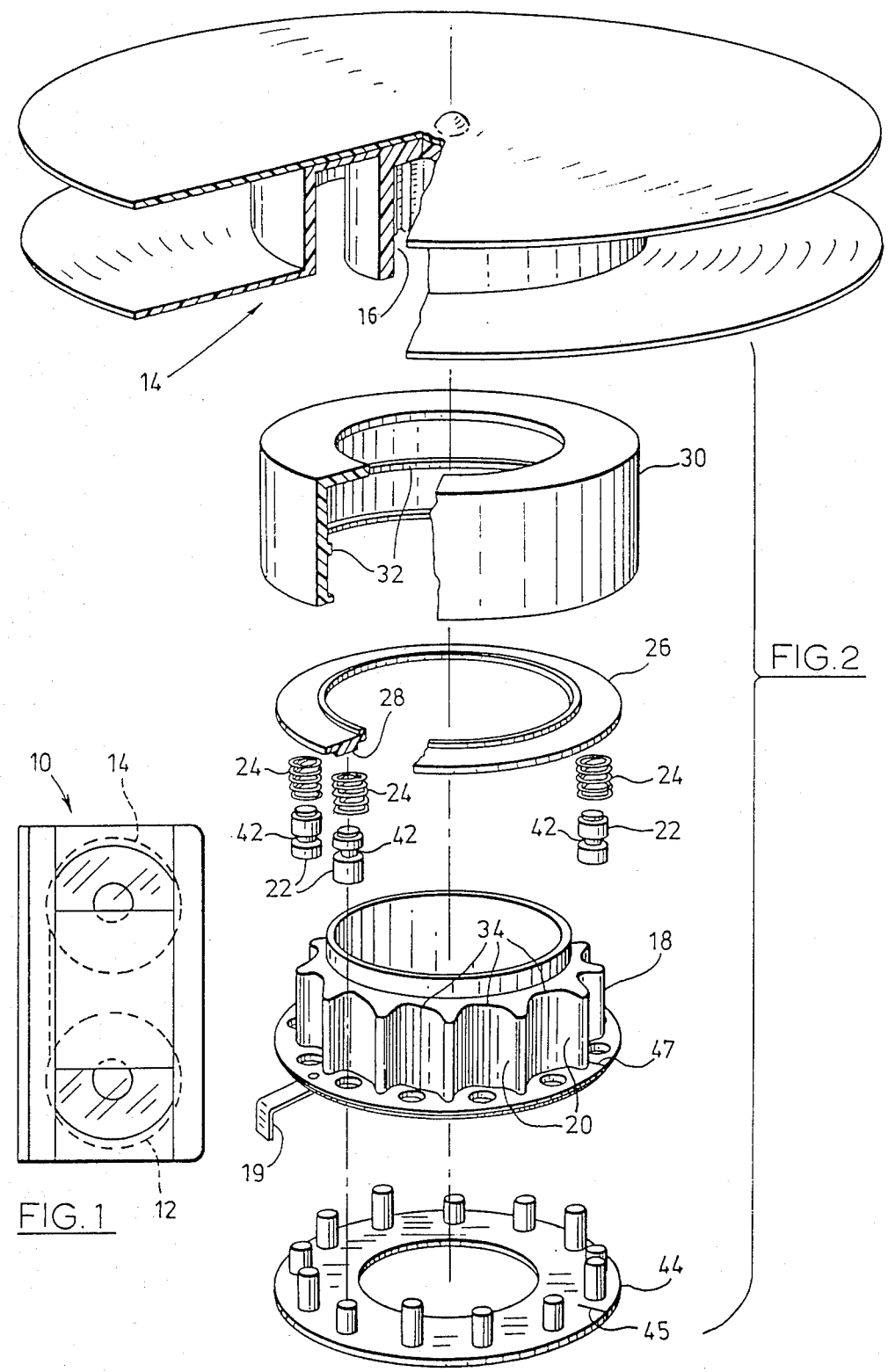
FIG. 1 is an illustration of a video tape cassette.
FIG. 2 is an exploded view of the clutch assembly described herein.

The assembly includes a roller cage 18 which is maintained nonrotatable with respect to the body of the cassette. The roller cage 18 is illustrated in FIG. 2. It has a series of axially aligned channels 20, each adapted to receive a cylindrical roller clutch element 22. Cylindrical roller clutch elements 22 illustrated are supported at one end by the flanged bottom of the roller cage and are urged into contact with the bottom by compressed springs 24. A spring holder ring 26 is provided with a boss 28 for the upper end of each spring and is a snap fit on the roller cage to rigidify it with respect to its roller cage and underlie the housing 30 which is rigidly mounted on and secured with respect to the rotatable reel 14. Housing 30 has an inwardly directed brake ring 32 the brake surface of which bears against the side of the roller elements 22 to prevent rotation in one direction when the clutch is operative. Housing 30 has a flange 31 at its lower edge that is sprung over a mating flange on the roller cage as illustrated in FIG. 3. This is a free fit that permits the relative rotation of the parts as described. Principal parts are moulded from a plastics material.

In use, the cassette with its clutch assembly is mounted on the tape deck in the usual way, the drive splines 16 being standard and connecting with the standard drive spindles on the tape deck. The roller cage 18 is nonrotatable with respect to the cassette body and when driving power is applied to the take-up reel to rotate the takeup reel, the clutch assembly just described will, when operative, permit the free rotation of the reel and the associated housing 30 with respect to the cassette body and roller cage in one direction only. The roller cage in the embodiment illustrated has a flat strip of brass 19 that engages in a hole in the cassette body to prevent relative rotation between roller cage and cassette body. The operation of the clutch will now be described.

The channels 20, cylindrical rollers 22 that are moveable longitudinally of the channel, and locking ring 32 are elements of a novel roller clutch assembly that is able to achieve the desired result in a very efficacious manner.

Figure 4:
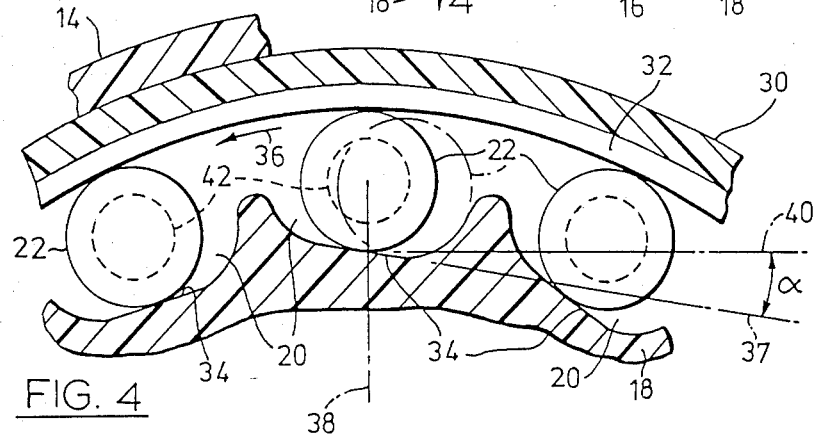
FIG. 4 is a partial sectional view through the clutch assembly along the line 4—4 of FIG. 3 illustrating the manner in which the rollers are caused to wedge between the ramp surface of the channels of the roller cage and the brake ring as will be described.

FIG. 4 illustrates the operation of the clutch. The channels 20 which house the rollers 22 have a flat ramp surface 34 at their bottom. When a force is applied to rotate the reel 14 in the lock direction as indicated by the arrow 36, the rollers 22 wedge between the locking ring 32 and the ramp surface 34 of the channels 20 to lock the reel against further rotation with respect to the cassette housing. When the reel is rotated in the opposite or free-wheeling direction the rollers 22 tend to move in the direction of rotation and become freely spaced between the channels 20 and ring 32 so that rotation is possible. The dotted line position of roller 22 illustrates an extreme free position of the rollers on the ramp. In use they do not move this far to the right. They move to the right and down their respective ramp only a sufficient distance that permits free rotation of the reel.

The design of the rollers, surfaces of the roller cage, the ramp and the ring 32 under these conditions is according to standard roller clutch design practice.

In this connection the numeral 38 is a line from the center of rotation of the reel through the longitudinal axis of the roller when the roller is in wedging relation with the ramp. Numeral 37 is a line that is tangent to the ramp surface at the point of contact of the roller with the ramp and line 40 is a line at right angles to line 38 and through the point of contact of the roller with the ramp. The contained angle "alpha" between lines 37 and 40 is, in the case of the design illustrated, about 10 degrees and is herein referred to as the ramp angle. According to standard design practice for clutches of this nature, this angle should be smaller than the angle of friction between the roller and the ramp surface. The roller, in the case of the design illustrated, is aluminum and the ramp surface is an acetal resin.

The direction of the longitudinal axis of the springs 28 can be biased to urge the rollers with a slight force in a direction up the ramp in the embodiment of the invention illustrated. The upper ends of the springs are located by bosses 28 on the spring holder ring 26 and by adjusting the spring holder slightly in the direction of the arrow 36 from the position where the axis of the springs are vertical one can achieve a lateral spring force on the springs that biases the rollers slightly in the direction of up the ramp as viewed in FIG. 4. This is done in the assembly of the roller cage and the spring holder ring. It has been found that if the upper end of the spring is about one or two degrees from the longitudinal axis of the locking pin that a desirable biasing is achieved. The lateral biasing spring force that tends to urge the rollers into locking relaiton is small and substantially unrelated to the compression spring force that forces the rollers downwardly.

In the case where the clutch assembly is normally in use in a horizontal position the springs 24 can be dispensed with, the rollers being urged to the downward position by gravity. In this case the rollers are free to move laterally and this freedom together with bearing play between the roller cage and the locking ring will enable wedging engagement upon attempt to reverse rotation of the reel.

An important feature of the clutch assembly is its ability to be released to permit rotation in either direction. This is achieved by moving the rollers longitudinally of their respective channels from an operative position between the roller cage and brake ring to an inoperative position between the roller cage and brake ring.

Each of the rollers has a circumferentially extending groove 42 which, under conditions of normal operation of the clutch, is spaced from the locking ring to put the rollers in wedging capability. However, the rollers can be moved axially of themselves against the compressed roller springs 24 or against the gravity of their own weight when no springs are used. This can be achieved by means of inserting a pin through a hole in the bottom of the roller cage 16. With an appropriate length pin the rollers can each be moved longitudinally of their respective channels so that their respective grooves 42 are aligned laterally with the braking surface of the locking ring 32. The width and depth of the grooves is of a dimension so that when this occurs the locking ring can no longer be in wedging contact with the rollers so that they cannot wedge between the ramp surface of the roller cage and brake ring as explained above and the reel can be rotated freely in either direction. The rollers are out of wedging capability. The opening in the bottom of the cassette body through which the central opening 16 extends is large enough to expose the bottom of the casing 18 for access by pins.

The grooves 42 are located at four different elevations longitudinally of their respective pins. To achieve an effective release of the clutch operation it is necessary that the grooves of all rollers be aligned with the locking ring. Thus, it requires pins of four different pin lengths to locate the various rollers in a disengaged position where they are spaced so that they cannot wedge between the roller cage and the brake ring. The locking pins 46 can be conveniently mounted on a ring 44. Ring 44 with correctly sized pins and in correct rotational relationship with respect to the reel will serve to move each of the rollers to a location where its groove is aligned with the locking ring with one operation. It will be apparent that the number of combinations of pin lengths and ring positions of rotation which are possible for a given roller combination is large. It is $4^{13}$, for grooves at four elevations and thirteen grooves only one of which will render the clutch inoperative.

Figure 5:
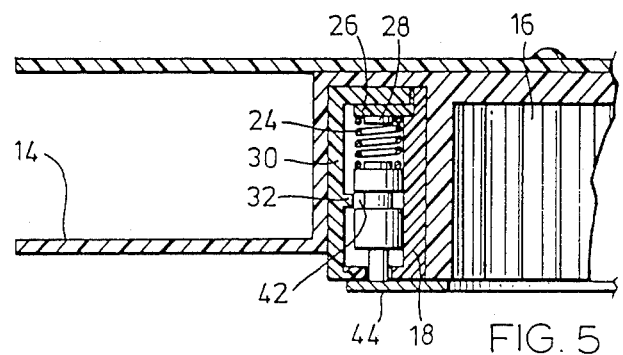
FIG. 5 is an illustration similar to FIG. 3 but illustrating the rollers in an inoperative position wherein the rollers have been moved longitudinally of themselves to cause their respective grooves to be located opposite the brake ring whereby to render the clutch inoperative.
Figure 6:
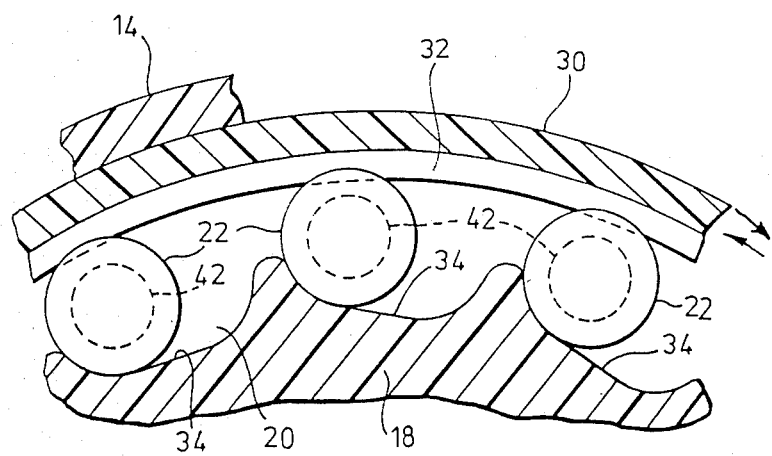
FIG. 6 is an illustration showing the relationship of the brake ring and the pins in the inoperative position.

FIG. 5 is a cross-sectional illustration which shows the ring 44 in place and one pin which elevates its roller to the inoperative position. Each of the other pins actuates its respective roller in the same manner.

Thus, it is necessary to have a ring that is co-related to the design of the rollers in respect of their grooves to free the clutch for rotation in either direction.

The rollers are put in at manufacture in a known order and cannot be easily tampered with so that, in effect, it requires a ring of a very special pin size and arrangement to free the clutch. This is a security feature for the clutch. The ring must be aligned with the roller cage in the direction of rotation and this is achieved by aligning marks 45 and 47 on the roller cage and ring respectively.

It has utility in the case where it is desired to prevent the showing of a particular tape. Unless freed, it can be locked against rotation in the cassette in one direction.

The locking ring is thin enough to be located on the outside of the cassette casing and permit the cassette to operate in the usual way on a tape deck.

The invention has been described for use with a one play tape cassette. The clutch assembly could also be used to lock the cassette from play unless a locking ring like ring 44 were inserted. In this case it would be installed on the supply roll of the cassette, the ramp would slope in the opposite direction and the clutch would lock rotation of the supply reel unless a release ring like ring 44 is inserted.

Alternative ways for operating the rollers into and out of the inoperative position will be apparent to those skilled in the art. The important thing is a roller clutch of a design that can be rendered operative and inoperative by manipulation of a series of rollers or the like to a predetermined position in the channel of the roller cage the location of which is secure and confidential to the owner of the cassette.

While a cylindrical roller has been used it is contemplated that other rollers such as balls could be used and also that other means for taking the rollers into and out of wedging capability between the ramp surface of the channels and the brake surface could be used. If ball rollers were used they could be rendered inoperative by causing them to enter into a round hole in the bottom of the channel that was located at a predetermined distance between the ends of the channel. The form of the brake and channels is also capable of variation within the scope of the invention.

Figure 7:
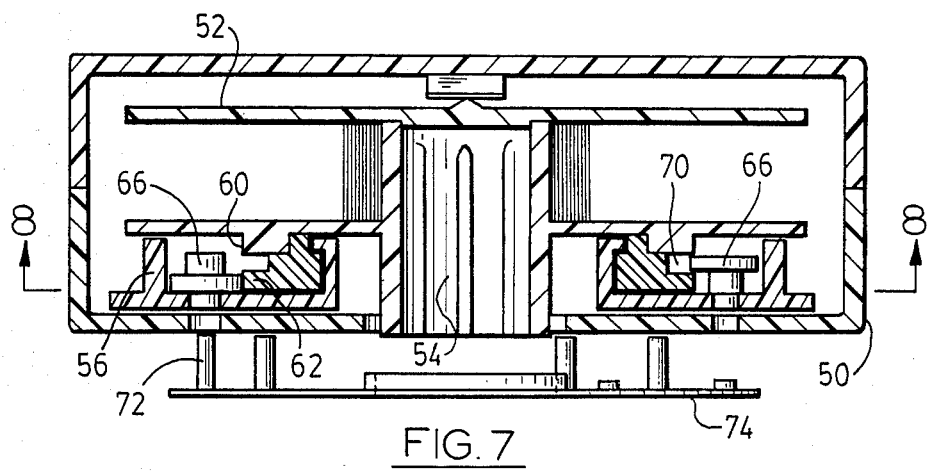
FIG. 7 is an illustration of a cross-section through one end of a cassette illustrating an alternative embodiment.
Figure 8:
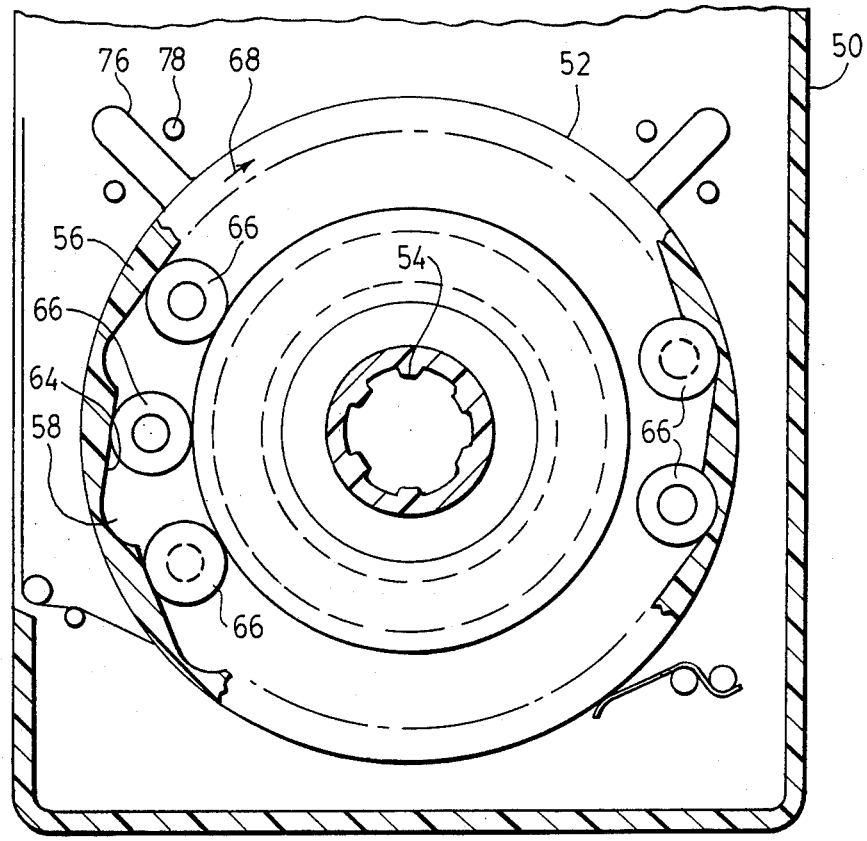
FIG. 8 is an illustration along the lines 8—8 of FIG. 7.

FIGS. 7 and 8 illustrate a further embodiment of the invention. FIG. 7 is a cross-sectional view through an end of a cassette and FIG. 8 is a view along the line 8—8 of FIG. 7, but showing only the reels of the cassette that have the releasable locking means.

A reel 52 is mounted within the casing for rotation. It is a standard reel and has a splined opening 54 for connection to a drive shaft of a tape deck. The roller cage 56 is kept from rotation with respect to the casing 50 by means of arms 76 that extend from the roller cage and set between posts 78 on the casing. Roller cage 56 has a series of channels 58, that open towards the centre of rotation of the reel. There are two brake surfaces, an upper one 60 being formed integral with the reel and a lower one 62 which is separately formed and rigidly secured to the reel. The channels 58 each have a ramp surface 64 and rollers 66 in each of the channels 64 can be moved longitudinally of the channels between an operative position wherein they can wedge between the ramp surface 64 of their respective channel 58 and one of the two break surfaces 60 or 62 to permit rotation of the reel in one direction only and an inoperative position wherein they have no cooperative relation with the brake surfaces and permit rotation of the reel in both directions.

The roller 66 on the left hand side of FIG. 7 is shown in wedging relation between the ramp surface 64 of its channel 58 and the lower break surface 62.

The ramp surface 64 is designed to have a slope such that the wide diameter of the rollers 66 will wedge between the ramp and a brake surface when the reel is turned in one direction with respect to the casing, but roll down the ramp and space itself between the ramp surface and the locking ring when the reel is rotated in the opposite direction. The principles of design of the ramp to achieve this purpose have been explained in association with the embodiment of FIG. 1 and will not be referred to in detail again in connection with this embodiment.

In the embodiment illustrated the roller cage and break engage when the rollers are in an operative position in their respective channel and there is rotation of the reel in the direction of the arrow 68.

With this embodiment it will be noted that all rollers 66 are of the same dimension, the only difference between them being that they can be inserted with the small diameter up as illustrated on the left of FIG. 7 or with the small diameter down as illustrated on the right of FIG. 7.

To move any roller so that it is inoperative, one moves the roller longitudinally of its channel so that the large diameter of the roller is opposite the groove 70 between the two break surfaces 60 and 62 of the brake means. When the large diameter of a roller is in this position there is too much space between the ramp surface of the roller cage and the reel to achieve any clutch action and the reel is free to rotate in the body casing in either direction of rotation.

This embodiment has advantage in that there is only one design of roller and only two positions of vertical adjustment for each roller. The roller on the left hand side of the drawing is shown in its lower position. When moved to its second or upper position its large diameter is aligned with the groove 70 and it becomes inoperative. The roller on the right hand side of the FIG. 7 is shown in a inoperative position but can be rendered operative by moving it longitudinally of its channel to its upper position. The rollers can be moved between their two positions of adjustment by means of pins 72 that are mounted around the ring 74. The channels of the roller cage are accessible through holes in the bottom of the casing and the roller cage to permit the pins to enter and move the rollers between their two positions one of which is operative and the other inoperative from the clutching operation point of view.

The rollers illustrated on the left hand side of FIG. 7 are illustrated in a position wherein they cooperate with the roller cage and break ring to achieve clutch action and the rollers on the right hand side of FIG. 7 have been illustrated in the noncooperative position wherein they permit relative rotation between the reel and casing in both directions. To achieve free rotation of the reel they should all be moved to the inoperative position.

This embodiment has the channels outboard of the breaking surfaces and provides for reel hub of reduced diameter and a greater reel tape capacity. The release is more simple because there are only two positions of each roller in its channel. The roller design is uniform. At the same time there are over 67 million roller position combinations in a clutch assembly having 26 rollers.

The release need not be performed by a ring. Any means for making the movement is possible. A solenoid could be used in the case of a ferrous metal roller. With this embodiment and only two positions of the roller it would only be necessary to provide an up and a down solenoid movement, each of which could be against a stop.

In use the owner could rent a cassette for a single play, repossess it after it had been played once, render the clutch inoperative, rewind the tape, render the clutch operative and rerent it for a further single play. This is a practical use of the device and in this case a more sophisticated release mechanism to perform the function of the rings would likely be used.

Embodiments of the invention other than the ones described will be apparent to those skilled in the art and it is not intended that the invention should be restricted to the embodiments described.

What I claim as my invention is:

1. A cassette having a casing and reels mounted for rotation within the casing and connectable to a rotatable drive shaft to transfer tape from one reel to the other characterized by:
    locking means for locking one of said reels against rotation with respect to the casing in only one direction when operative;
    said locking means being releasable to render it inoperative and to permit said reel free rotation with respect to the casing in either direction;
    said locking means including a roller cage, brake means and rollers;
    one of said roller cage and brake means being nonrotatable with respect to said body the other of the roller cage and brake means being nonrotatable with respect to the reel;
    said roller cage having a series of channels arranged in a circle;
    each channel of said series of channels having one of said rollers therein;
    said brake means having a brake surface;
    said roller cage and said brake surface of said brake means defining a space therebetween that is annular in cross section, each of said channels of said series of channels having a ramp surface at its bottom that slopes towards the brake surface on the brake means in the direction against which the locking means locks;
    said rollers being moveable longitudinally of their respective channels between positions to dispose said locking means in an operative position or an inoperative position, said operative position being one where the rollers wedge between a brake surface of the brake means and the ramp surface of the roller cage to lock against rotation of reel with respect to the casing in one direction and permit free rotation in the other direction, the inoperative position being one where the rollers will not wedge between the roller cage and brake means whereby to permit free rotation of the reel with respect to the casing in either direction of rotation; the distance in a radial direction across the space of annular cross section between the roller cage and brake surface being of a length that is different for the operative position of the rollers and the inoperative position of the rollers, the said distance being longer in the inoperative position than the operative position and long enough in the inoperative position to avoid wedging between the roller cage and brake means as aforesaid and short enough in the operative position to cause wedging between the roller cage and brake means as aforesaid.

2. A cassette as claimed in claim 1 wherein each of said rollers is cylindrical and has a circumferentially extending portion of reduced diameter; said cylindrical rollers being moveable longitudinally of their respective channels as aforesaid between said operative and said inoperative position to vary the location of said section of reduced diameter with respect to the brake surface of the brake means between said inoperative location where the reduced diameter is opposite the brake surface of the brake means and an operative location where the reduced diameter is not opposite the brake surface of the brake means.

3. A cassette as claimed in claim 1 in which said roller cage is nonrotatable with respect to said casing and the brake means is rotatable with the reel.

4. A cassette as claimed in claim 2 in which said roller cage is nonrotatable with respect to said casing and the brake means is rotatable with the reel.

5. A cassette as claimed in claim 2 wherein the rollers have their portion of reduced diameter at different axial locations whereby different amounts of movement longitudinally of their respective channels is required to dispose them in an operative position.

6. A cassette as claimed in claim 2 wherein said rollers are all of similar design and having said portion of reduced diameter at one end, some of said rollers being in their respective channels with their portion of reduced diameter in an upward direction and others being in their respective channels with their portion of reduced diameter in a downward direction, said rollers each being operable to only two positions longitudinally of their respective channels, one position being said operative position the other position being said inoperative position.

7. A cassette having a body and two reels rotatable with respect to the body, characterized by one of the reels having a roller clutch between it and the casing, the roller clutch having rollers, a brake surface extending around the rollers, and a roller cage, the rollers each being contained in a channel with a ramp surface formed in the roller cage, the rollers being adapted to wedge between the ramp surface and a brake surface to prevent rotation of the reel in one direction but permit rotation in the other direction, the rollers being adjustable longitudinally of their respective channels to remove them from wedging capability with the brake surface whereby to free the reel for rotation in either direction.

8. A cassette as claimed in claim 7 wherein each of said rollers is formed with a circumferentially extending groove, said groove having a width to admit said brake surface, said rollers being adjustable to align their respective grooves with said brake surface and to carry them from operative relation with said brake surface as aforesaid, said grooves having a width and depth to space their respective rollers out of wedging capability with said brake surface.

9. A cassette as claimed in claim 8 in which said groove in said rollers is formed at various distances from the end of its respective rollers whereby a different amount of axial movement is required from roller to roller to align their respective groove with the brake surface.

10. A cassette as claimed in claim 9 wherein said roller cage is nonrotatable with respect to said casing and said surface means is rotatable with one of said reels.

11. A cassette as claimed in claim 8 wherein said roller cage is nonrotatable with respect to said casing and said brake surface is rotatable with one of said reels.

12. A cassette as claimed in claim 7 wherein said roller cage is nonrotatable with respect to said casing and said brake surface is rotatable with one of said reels.

* * * * *